US006779040B1

(12) United States Patent
Lee et al.

(10) Patent No.: US 6,779,040 B1
(45) Date of Patent: Aug. 17, 2004

(54) METHOD AND SYSTEM FOR SERVING DATA FILES COMPRESSED IN ACCORDANCE WITH TUNABLE PARAMETERS

(75) Inventors: Daniel T. L. Lee, Los Altos, CA (US); Ho John Lee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/384,827

(22) Filed: Aug. 27, 1999

(51) Int. Cl.[7] ............................. G06F 15/16; G06K 9/36

(52) U.S. Cl. ...................... 709/247; 382/250; 382/280; 382/305

(58) Field of Search ................................. 709/227, 230, 709/231, 232, 233, 236, 237, 247; 382/232, 248, 249, 250, 251, 252, 253, 276, 280, 305

(56) References Cited

U.S. PATENT DOCUMENTS

| | | | | | |
|---|---|---|---|---|---|
| 5,666,215 | A | * | 9/1997 | Fredlund et al. | 358/487 |
| 5,774,674 | A | * | 6/1998 | Gutmann et al. | 395/200.67 |
| 5,850,484 | A | * | 12/1998 | Beretta et al. | 382/250 |
| 5,875,249 | A | * | 2/1999 | Mintzer et al. | 380/54 |
| 5,892,847 | A | * | 4/1999 | Johnson | 382/232 |
| 5,911,776 | A | * | 6/1999 | Guck | 709/217 |
| 5,949,891 | A | * | 9/1999 | Wagner et al. | 381/98 |
| 5,953,506 | A | | 9/1999 | Kalra et al. | 395/200.61 |
| 6,101,284 | A | * | 8/2000 | Matsubara et al. | 382/260 |
| 6,118,903 | A | * | 9/2000 | Liu | 382/245 |
| 6,233,618 | B1 | * | 5/2001 | Shannon | 709/229 |
| 6,282,322 | B1 | * | 8/2001 | Rackett | 382/248 |
| 6,311,215 | B1 | * | 10/2001 | Bakshi et al. | 709/221 |
| 6,345,303 | B1 | * | 2/2002 | Knauerhase et al. | 709/238 |
| 6,598,091 | B1 | * | 7/2003 | Yoo et al. | 709/246 |

FOREIGN PATENT DOCUMENTS

| | | | | |
|---|---|---|---|---|
| WO | WO9843177 A | 10/1998 | ............ | G06F/13/38 |
| WO | WO0108097 A | 2/2001 | ............. | G06T/1/00 |

OTHER PUBLICATIONS

Li, Chung–Sheng et al: "Multimedia Content Description in the Infopyramid" Proceedings of the 1998 IEEE International Conference on Acoustics, Speech and Signal Processing. ICASSP '98. Seattle, WA, May 12–15, 1998, IEEE International Conference on Acoustics, Speech and Signal Processing, New York, NY: IEEE, US, vol. 6 Conf. 23, May 12, 1998, pp. 3789–3792, XP000863280. ISBN: 0–7803–4429–4.

* cited by examiner

Primary Examiner—Dung C. Dinh

(57) ABSTRACT

A method and system for transferring data files from a sever entity, such as a server computer, to a client entity, such as a client process running on a remote client computer. The data files are stored in a frequency domain form by the server entity. The client entity can specify certain characteristics for the transfer that may be represented as one or more parameters. Parameters may include a compression ratio and certain data enhancements. Default or computed parameters may be used by the server entity when no client-specified parameters are available. Upon receiving a request for a data file, the server entity retrieves the frequency domain form of the data file, quantizes frequency domain coefficients included in the frequency domain form of the data file according to the parameters, compresses the quantized frequency domain coefficients into a compressed data file, and transfers the compressed data file to the client entity.

32 Claims, 16 Drawing Sheets

METHOD AND SYSTEM FOR SERVING DATA FILES COMPRESSED IN ACCORDANCE WITH TUNABLE PARAMETERS

TECHNICAL FIELD

The present invention relates to the transfer of compressed files from a server computer to a client computer and, in particular, to a method and system for compressing stored data files by a server computer, in a memory-efficient manner, according to parameters that reflect the client computer's capabilities and the preferences of a user of the client computer.

BACKGROUND OF THE INVENTION

During the past five years, the volume of information exchanged between computer systems via the Internet has dramatically increased. Along with an increase in the volume of information, there has been a rapid increase in the variety of information exchanged via the Internet. Ten years ago, the Internet was used predominately for transfer of simple text files and larger binary data files. Today, users of personal computers ("PCs") routinely request and receive from server computers, via the Internet, complex graphical displays, high-resolution still images, recorded music and other audio files, animation and video files, and even live broadcast of relatively high-resolution video images.

While the greatly increased volume and rate of data exchange over the Internet has fueled many technological and commercial advances, a number of server-related problems have been exacerbated, particularly with respect to the transfer of data files, such as images and audio files, that are large in size and that may be rendered for presentation on a number of different types of user rendering and presentation devices. The rate at which data can be transferred from a server computer to a client computer via the Internet, and particularly to home PCs, may be quite limited. Files containing data for still images and video images, for example, may be quite large, on the order of hundreds of kilobytes to tens or hundreds of megabytes. A user interactively requesting and displaying images on a home PC from a server via the Internet may often encounter very long data transfer delays due to the large sizes of requested image, audio, and video files. A primary technique for improving data transfer rates is to compress the data prior to transferring it from a server computer to a client computer. Once the data has arrived at the client computer, the data can be decompressed to restore the image to a displayable format. Thus data compression provides a means for decreasing the amount of data that needs to be transferred in order to transfer an image from the server to the client computer more quickly.

Many different types of data compression and decompression algorithms are available. Under lossless data compression and decompression algorithms, the stored image is identical, in information content, to the original image resident on the server computer. Under lossy data compression and decompression, the restored image may contain less information, and may also contain certain visual artifacts that arise during the compression and decompression processes. Generally, greater compression ratios can be achieved by lossy compression and decompression algorithms. In many cases, the information lost during lossy compression and decompression may be unnecessary, because the client computer is incapable of using the lost information for improving the rendering and presentation of the data. For example, a high-resolution image file that can be displayed on a high-end specialized graphics terminal may contain far greater information or, in other words, greater image detail, than can be displayed by a relatively low-resolution PC display screen. In addition, various mathematical manipulations that can be incorporated into the compression and decompression algorithms provide a means for altering data so that the data can be rendered more faithfully by different types of rendering and presentation components. For example, the visual appearance of a color image rendered for display on a CRT screen may differ dramatically from the visual appearance of the same color image printed on a color printer. Compression and decompression algorithms can incorporate different types of enhancement algorithms in order to tailor a restored image for rendering and presentation on a particular device. Using the same example, if the server computer can determine that a user is requesting an image file in order to print the file on a printer, the server computer can compress the image in a way that will allow the image to be restored on the user's computer in a form that produces the visual appearance of the image as displayed on the CRT screen. Unfortunately, the rendering and presentation characteristics of various rendering and presentation components, including CRT and active matrix display screens and various printing devices, may differ dramatically from one type of device to another.

Server computer architects, Internet providers, and digital image processing scientists have recognized the desirability of serving differently compressed data files, including image files, to different users in order to provide the greatest possible data compression, and concomitant best possible data transfer rate, without unacceptable loss of information and to provide compressed data files that can be rendered and presented as faithfully as possible on different types of user rendering and presentation devices. A common technique is to prepare, in advance, a number of different compressed versions of each data file and to provide to a given user that version of a data file that most closely matches the capabilities of the user's computer and Internet connection and that most closely matches the user's preference. However, storage space on server computers is limited. Even compressed data files take up a large amount of data storage space. Practically, only a limited number of compressed versions of each particular data file served by a server computer can be economically and conveniently stored. Thus, only a very crude, low-granularity matching of compressed images to user computer capabilities and user preferences can be achieved in this way. On-demand compression of uncompressed and unprocessed data files is computationally expensive, incurs excessively long transfer delays, and required excessive amounts of server computer memory. Server architects and Internet developers have thus recognized a need for a method and system for tailoring data file compression more closely to user computer capabilities and user preferences, and for doing so in a more efficient manner with respect to server data storage and server memory resources.

SUMMARY OF THE INVENTION

One embodiment of the present invention provides a method and system for on-demand data compression of data files for transfer from a server computer to a client computer. A single compressed, or partially compressed, version of the data file is stored on the server computer. A user may register various user preferences and user computer capabilities with the server computer prior to requesting the data file, or may indicate some or all of the preferences and capabilities at the time of the request for the data file. The server computer then compresses the requested data file according to the capabilities of the user's computer and user preferences, using default values for parameters not specified by the user. The preferences and capabilities-based compression is achieved in a particularly computationally and memory efficient manner. The compressed data file is then sent from the server computer to the user computer, where it is decompressed and rendered for presentation by the user's computer.

In different embodiments of the present invention, different types of data files are compressed and decompressed using different compression and decompression algorithms. In one embodiment of the present invention, image data formatted according to the Joint Photographic Expert's Group ("JPEG") are compressed and decompressed according to JPEG compression and decompression algorithms, modified with various image enhancement techniques for efficient transfer of JPEG images from a server computer to a user's computer and for faithful rendering and presentation of the JPEG images by the user's computer. The method of the present invention may be applied to images formatted according to other standards, or to audio or video data files. Moreover, the technique of the present invention may be applied to the rendering and presentation of data files on various rendering and presentation devices directly connected to the computer system on which the data files are stored.

DETAILED DESCRIPTION OF THE INVENTION

One embodiment of the present invention relates to the serving of JPEG images stored on server computers to user computers via the Internet. Each user may register a set of user computer capabilities and user preferences with the server computer and, in addition, a user may specify a set of user computer capabilities and user preferences while requesting a particular JPEG image from the server computer. Upon receiving a request for a JPEG image file from a user computer, the server computer retrieves a compressed or partially compressed version of the JPEG image file and compresses it according to the specified capabilities of the requesting user's computer and according to any specified user preferences. This compression according to capabilities and preferences is carried out in a computationally efficient and memory-efficient manner. The JPEG image file compressed according to the capabilities of the user's computer and the user's preferences, is then transferred over the Internet to the user's computer.

Figure 1:
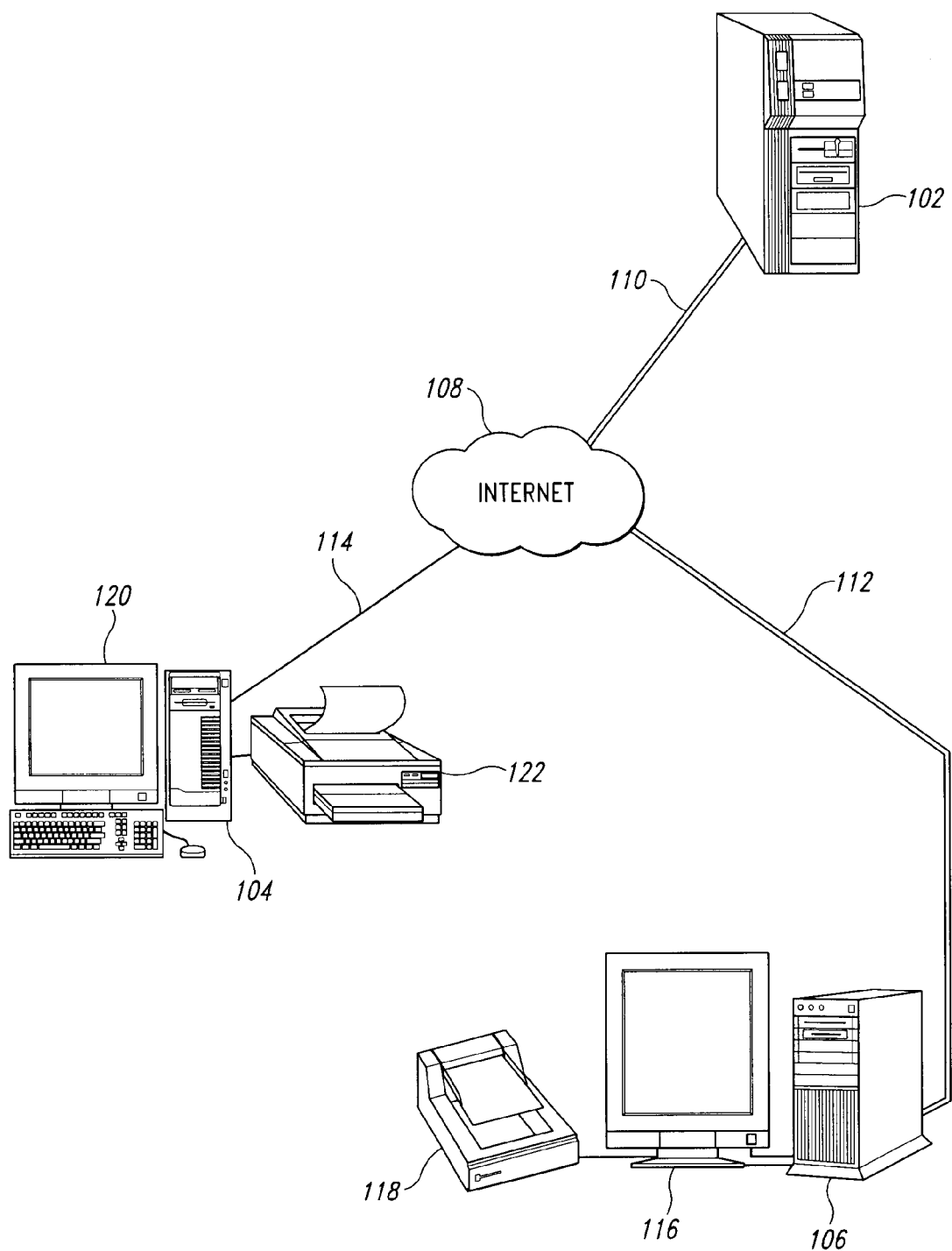
FIG. 1 illustrates the server/client environment in which the present invention is employed.

FIG. 1 illustrates the server/client environment in which the present invention is employed. A number of JPEG images are stored on a server computer 102. Client computers 104 and 106 are connected to the server computer 102 via the Internet 108. Client computer 106 and the server computer 102 are interconnected to the Internet 108 via high-speed/high-bandwidth connections 110 and 112, while client computer 104 is connected to the Internet via a relatively low-bandwidth modem and telephone line connection 114. Client computer 106 is interconnected with a high-resolution specialized graphics display device 116 and a high-resolution color printer 118. Client computer 104 is interconnected with a small, low-resolution display device 120 and a low-resolution printer 122. In the case where users operating client computers 104 and 106 both request the same large JPEG image file, it would be desirable for the server computer 102 to compress the image file differently for transmission to the two users. In the case of the user of client computer 104, it would be desirable for the server computer 102 to provide a highly-compressed version of the JPEG image file to client computer 104 both in order to minimize the amount of data transferred over the low-bandwidth connection 114 and to eliminate transmission of high-resolution detail that cannot be rendered and displayed on the low-resolution display device 120. In the case that the user of client computer 104 wishes to print the image on the low-resolution color printer 122, it would be desirable, for the server computer 102 to provide to the client computer 104 a highly-compressed JPEG image file enhanced for a more faithful printing on the low-resolution color printer 122. On the other hand, in view of the relatively high bandwidth of connections 110 and 112, and the high resolution of the specialized graphics display device 116, it would be desirable for the server computer 102 to provide the requested JPEG image file to client computer 106 in a less-compressed form with less information loss, since the high-resolution data can be rendered and displayed effectively on the specialized display device 116 and since the higher bandwidth of connections 110 and 112 can provide a sufficient rate of data transfer to quickly transfer a larger, less-compressed version of the JPEG image. If the user of client computer 106 intends to print the requested JPEG image on the high-resolution color printer 118, it would be desirable for the server computer 102 to enhance the compressed JPEG image file for faithful presentation on the high-resolution color printer 118. The enhancement desirable for the high-resolution color printer 118 may be quite different from the enhancement desirable for the low-resolution color printer 122. Moreover, it may be the case that JPEG images display, in general, more brightly on the low-resolution display device 120 than on the high-resolution display device 116. Therefore, it would be desirable for the server computer to compress the JPEG image in a way that enhances the brightness of the image when transferring the JPEG image to client computer 106.

Figure 2:
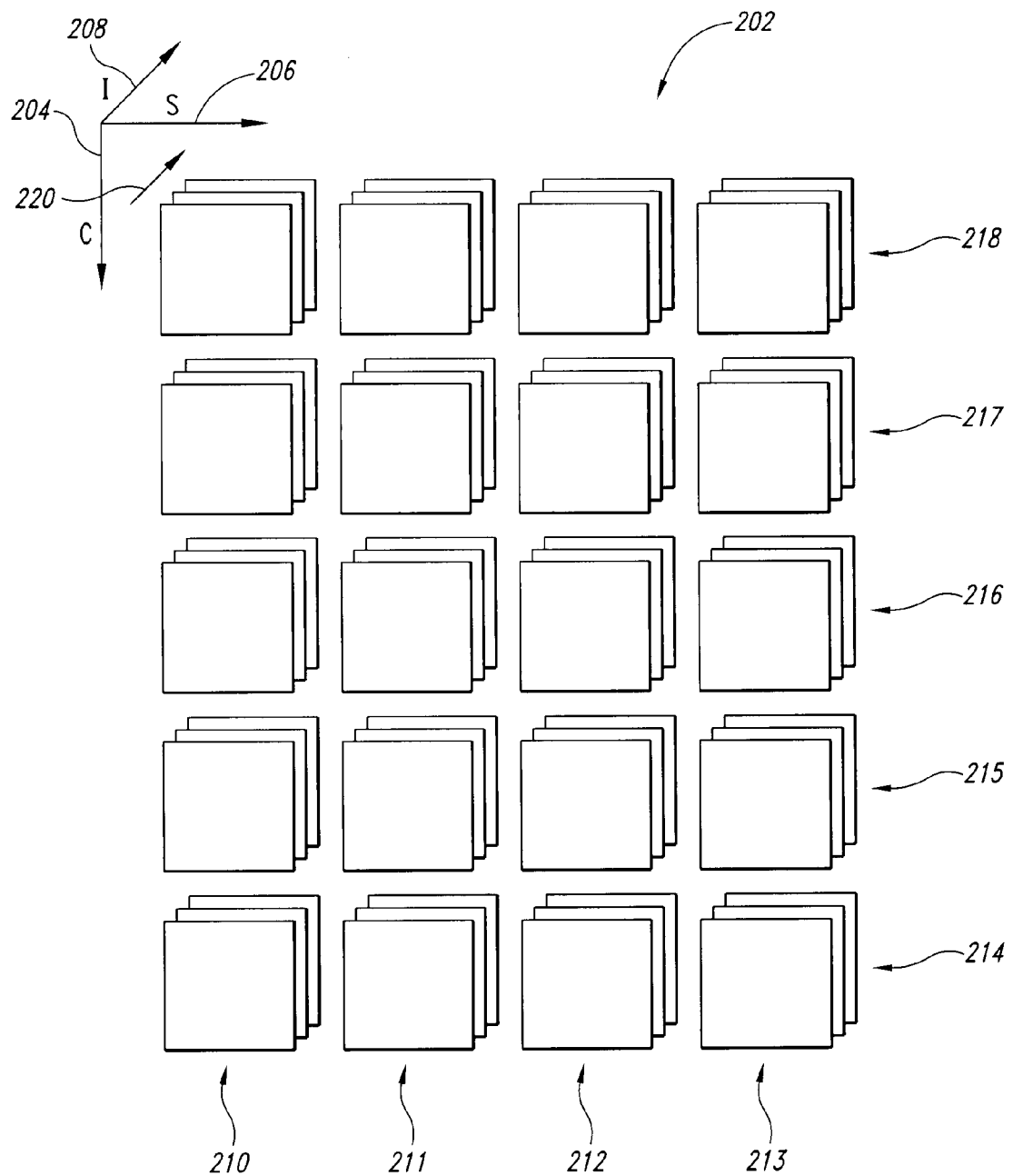
FIG. 2 illustrates one conceptual approach to providing a JPEG image at different compressions and with different enhancements to different client computers.

FIG. 2 illustrates one conceptual approach to providing a JPEG image at different compressions and with different enhancements to different client computers. In this approach, a given JPEG image can be compressed and enhanced in many different ways, and the resulting versions of the JPEG image can all be stored within the server computer. Continuing with the example presented in FIG. 1, the various versions of the JPEG image can be conceptualized as stored within a logical Cartesian volume 202 with orthogonal axes representing the compression ratio 204, a scaling factor 206, and an intensity factor 208. Thus, the compression ratios of the stored JPEG image versions increase downward along vertical columns 210–213 within the Cartesian volume. A scaling factor, corresponding to boosting of certain portions of frequency signal of the image, discussed further below, may increase along horizontal rows 214–218 of versions of the JPEG image within the Cartesian volume. Finally, the intensity, or brightness, of the image within the Cartesian volume may increase along rows orthogonal to the plane of FIG. 2, such as the row indicated by arrow 220. Thus, when the server computer receives a request for the JPEG image, the server computer can select a particular pre-compressed version of a JPEG image within the Cartesian volume shown in FIG. 2 having a compression ratio, scaling factor, and intensity that most closely matches a desired compression ratio, scaling factor, and intensity determined from the requesting computer's capabilities and requesting user's preferences. Returning to the example of FIG. 1, when client computer 104 requests a particular JPEG image, the server computer 102 may select a compression ratio above which the visual appearance of the image as displayed on visual display device 120 would be deleteriously affected by the increased information loss that accompanies higher compression ratios, select either no intensity enhancement or a slight intensity enhancement, and select a scaling factor appropriate to enhance the JPEG image for faithful rendering and display on the low-resolution display monitor 120. The server computer may then select the version of the compressed JPEG image from the Cartesian volume 202 in FIG. 2 closest to the point in space defined by the chosen compression ratio, scaling factor, and intensity factor.

Unfortunately, the approach illustrated in FIG. 2 has several major drawbacks. One drawback is that even compressed JPEG image files are relatively large. Although, in some cases, compression ratios approaching 100:1 may be achieved, compression ratios on the order of 20:1 to 40:1 are more typical. If only ten different compression ratio levels, scaling factor levels, and intensity factor levels are used to define the Cartesian volume shown in FIG. 2, 1,000 different compressed versions of each JPEG image file would need to be stored by the server. Considering the wide variety of image rendering and presentation devices, as well as the wide variety of capabilities of client computers and Internet connections to client computers, a much larger range of compression ratio values, scaling factors, and image factors may be desirable to achieve an effective level of compression tunability. Because data storage is limited, storing hundreds or thousands of different compressed versions of each JPEG image is an extremely expensive and inefficient solution. Moreover, a considerable amount of computer processing time would be devoted to preparing, in advance, all the different compressed versions of each JPEG image file.

A second approach to providing tunable compressability for Internet servers is to store each image in uncompressed form, as one or more pixel arrays, and, upon receiving a request from a client computer for the image, compress the image, according to the JPEG compression and enhancement algorithms, using a compression ratio, a scaling factor, and an intensity factor chosen to meet the capabilities of the requesting client computer and the preferences of the user operating the client computer. However, compression is a computationally intensive task, as will be discussed below, and complete on-demand compression from an uncompressed image to a desired compressed image for Internet transfer would introduce unacceptable transfer delays. Furthermore, the storing of uncompressed image files is again limited by server data storage capacity, and compression requires large amounts of contiguous blocks of server memory.

Figure 3:
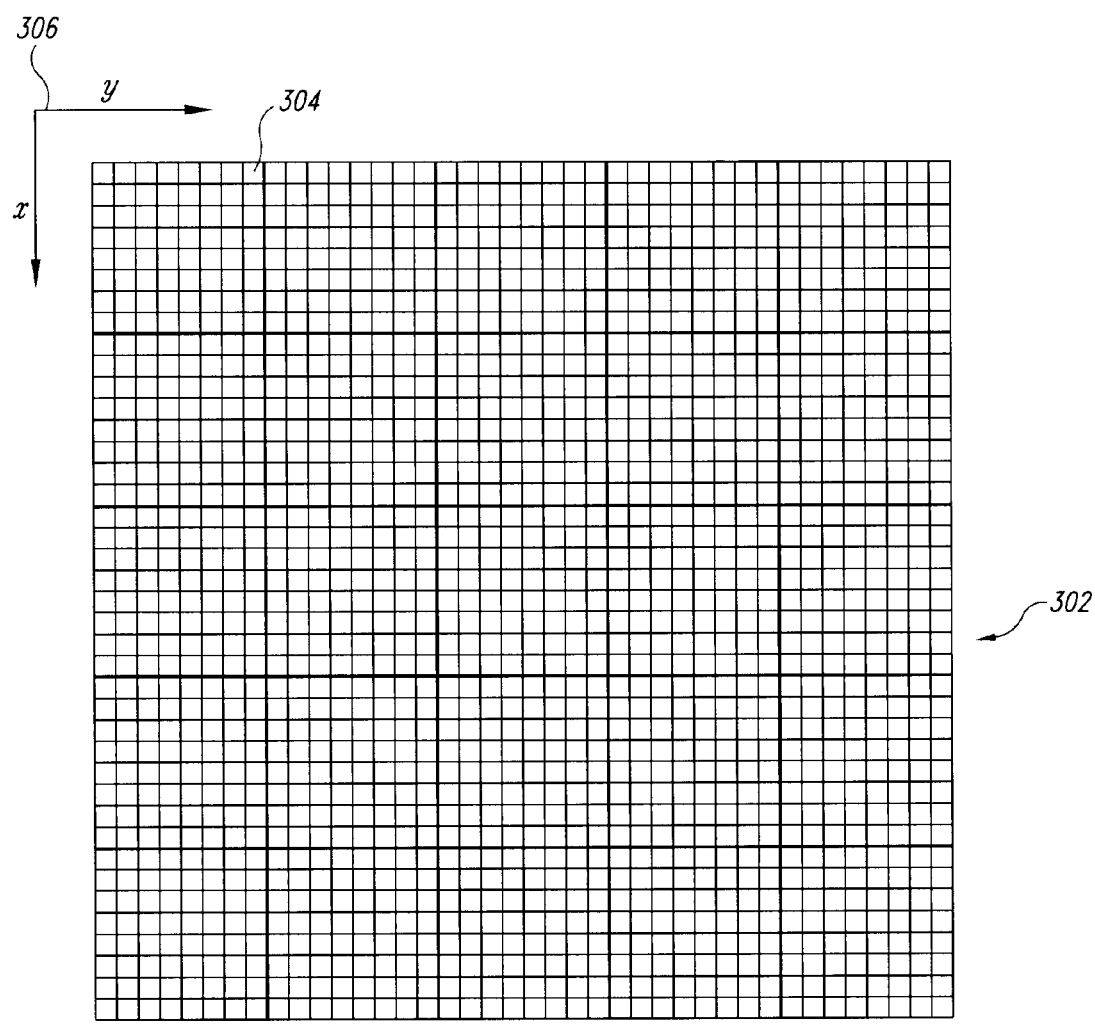
FIG. 3 illustrates a representation of a two-dimensional pixel array.

To facilitate discussion of the present invention, FIGS. 3–12, and the discussion below related to FIGS. 3–12, describe computation representation of images and image compression. A monochrome image is commonly represented in a computer as a two-dimensional pixel array. FIG. 3 shows a representation of a two-dimensional pixel array. Each cell within the pixel array 302, such as cell 304, represents the smallest displayable unit within the image. Cells within the pixel array 302 are referenced via a two-dimensional Cartesian coordinate system 306. Thus, for example, cell 304 has Cartesian x, y coordinates of (0,7). Each cell within the pixel array 302 contains a value. For monochrome images, the value is a grayscale value. Images are often represented by devoting 8 bits for each pixel, resulting in grayscale values ranging between 0 and 255. Commonly, a grayscale value of 0 represents black, or the absence of light emanating from the pixel, and a grayscale value of 255 represents white. An image can be considered to be a two-variable function defined over the two-dimensional pixel array:

$$\text{grayscale value} = f(x, y)$$

For example, if pixel 304 in FIG. 3 has a grayscale value of 100, then, in functional notation, $100 = f(0,7)$.

Figure 4:
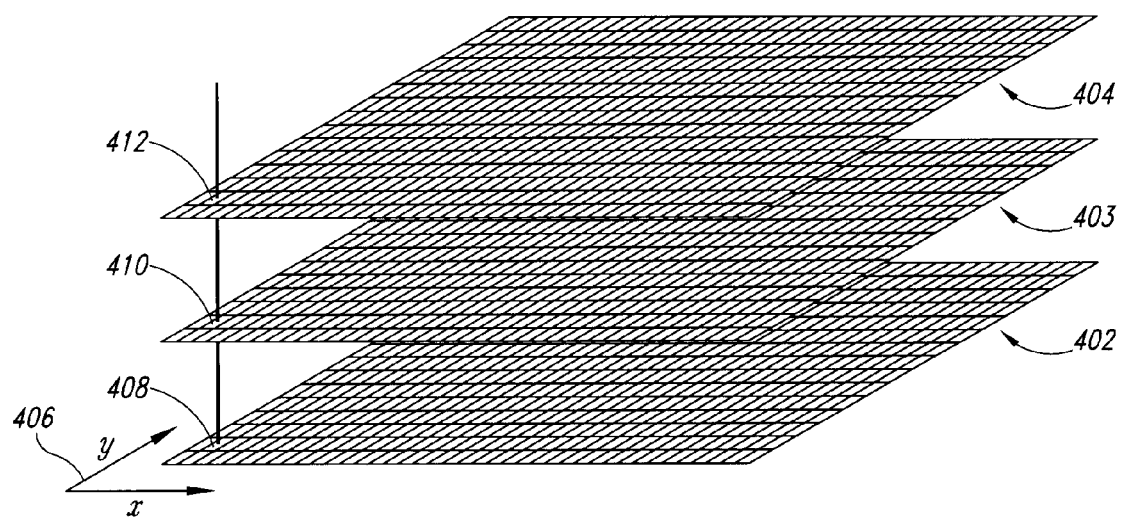
FIG. 4 illustrates a common computational representation of a color image.

Color images are represented in a slightly more complex fashion. FIG. 4 illustrates a common computational representation of a color image. The image is represented by three different two-dimensional pixel arrays 402–404. The arrays share the same two-dimensional Cartesian coordinate system 406, with the pixels in all three two-dimensional pixel arrays aligned and in register. For example, pixel (1,1) 408 of pixel array 402 is aligned with, and in register with, pixel (1,1) 410 of pixel array 403 and pixel (1,1) 412 of pixel array 404. The values in all three pixels 408, 410, and 412 are used to generate a color value displayed for pixel (1,1) in the displayed image. Different meanings may be assigned to the values stored in three pixel arrays that represent a color image. In one representation model, each plane is assigned to a different primary spectral component: red, green, and blue. The value stored in a pixel of the blue pixel array, for example, indicates the intensity of the blue primary spectral component displayed for the corresponding pixel in the displayed image. In the YIQ color model, the Y pixel array contains luminance values and the I and Q pixel arrays contain color information. In the HSI color model, the H pixel array contains values for hue, the S array plane contains values for saturation, and the I pixel array contains values for the intensity of the pixels. The latter two color models are particularly useful because the intensity information is stored separately, in a single pixel array, from the color information stored in the other two pixel arrays. The human visual system has higher-resolution sensitivity to intensity differences in an image than to color differences. Various image enhancement and sharpening techniques can be applied, in the YIQ and HSI color models, to the intensity pixel array alone, perceptibly sharpening the image, without introducing coloring misregistration or artifacts. In general, the compression, decompression, and image enhancement techniques, to be discussed below, can be applied both to the single pixel array of a monochrome image, such as the monochrome pixel array illustrated in FIG. 3, or can be separately applied to the three pixel arrays that together represent a color image. Thus, in the following discussion, the compression, decompression, and enhancement techniques will be discussed without regard to whether the image to which the techniques are applied is a monochrome image or a color image.

Figure 5:
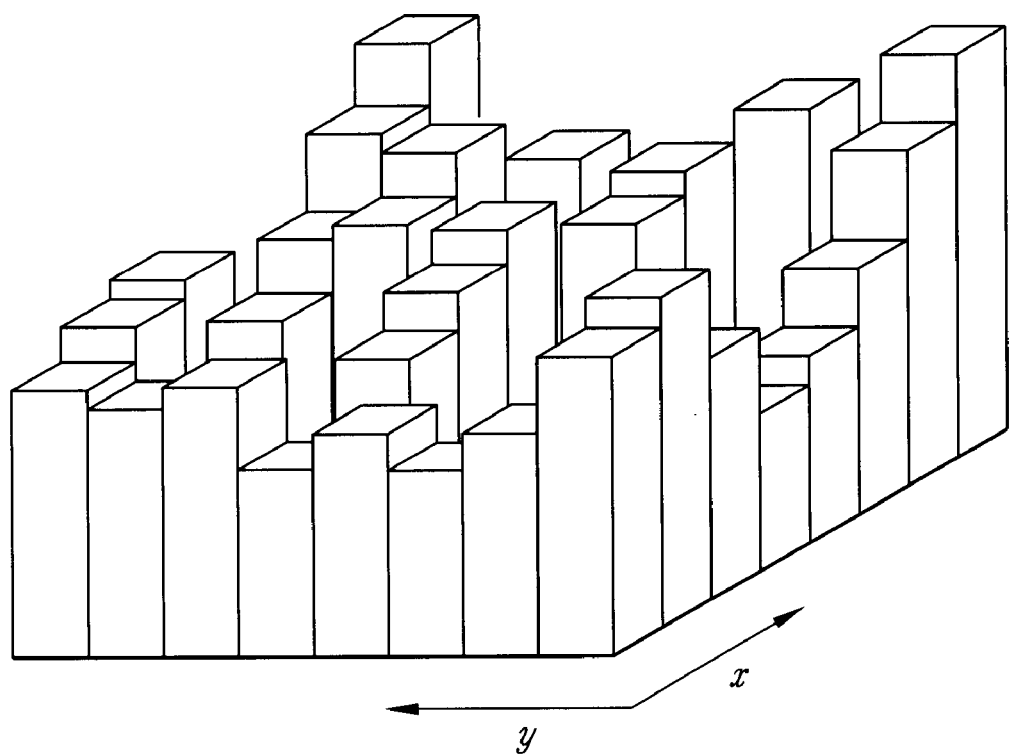
FIG. 5 illustrates an 8-pixel×8-pixel subsection from the pixel array shown in FIG. 3.

FIG. 5 illustrates an 8-pixel×8-pixel subimage from the pixel array shown in FIG. 3. In FIG. 5, the pixel values (grayscale, intensity, hue, or other such value, depending on the type of image representation) is shown by the height of the columns ascending vertically from the cells of the two-dimension Cartesian pixel plane. FIG. 5 is equivalent to a three-dimensional depiction of the two-variable function: grayscale=f(x,y). The values of this function over the pixel array represents the spatial domain of the image. In common images, the spatial domain may include repetitive features that are repeated at constant intervals, or periods, within the image. An example would be the spatial domain representation of an image of the grid-like pixel array shown in FIG. 3. In the spatial domain representation of the image, the vertical lines repeat at a fixed vertical interval, or period, and horizontal lines also repeat within the image at a fixed horizontal interval, or period.

A common mathematical transformation of the spatial domain representation of an image to a frequency domain representation of an image is accomplished by the discrete cosine transform, represented below functionally:

$$F_{(u,v)} = \alpha(u)\alpha(v)\sum_{x=0}^{N-1}\sum_{y=0}^{N-1} f_{(x,y)}\cos\left[\frac{(2x+1)u\pi}{2N}\right]\cos\left[\frac{(2x+1)v\pi}{2\pi}\right] \text{ where}$$

$$\alpha(u) = \sqrt{\frac{1}{N}} \text{ for } u = 0$$

$$\alpha(u) = \sqrt{\frac{2}{N}} \text{ for } u = 1, 2, \ldots, N-1$$

$$\alpha(v) = \sqrt{\frac{1}{N}} \text{ for } v = 0$$

-continued $$\alpha(v) = \sqrt{\frac{2}{N}} \text{ for } v = 1, 2, \ldots, N-1$$

Figure 6:
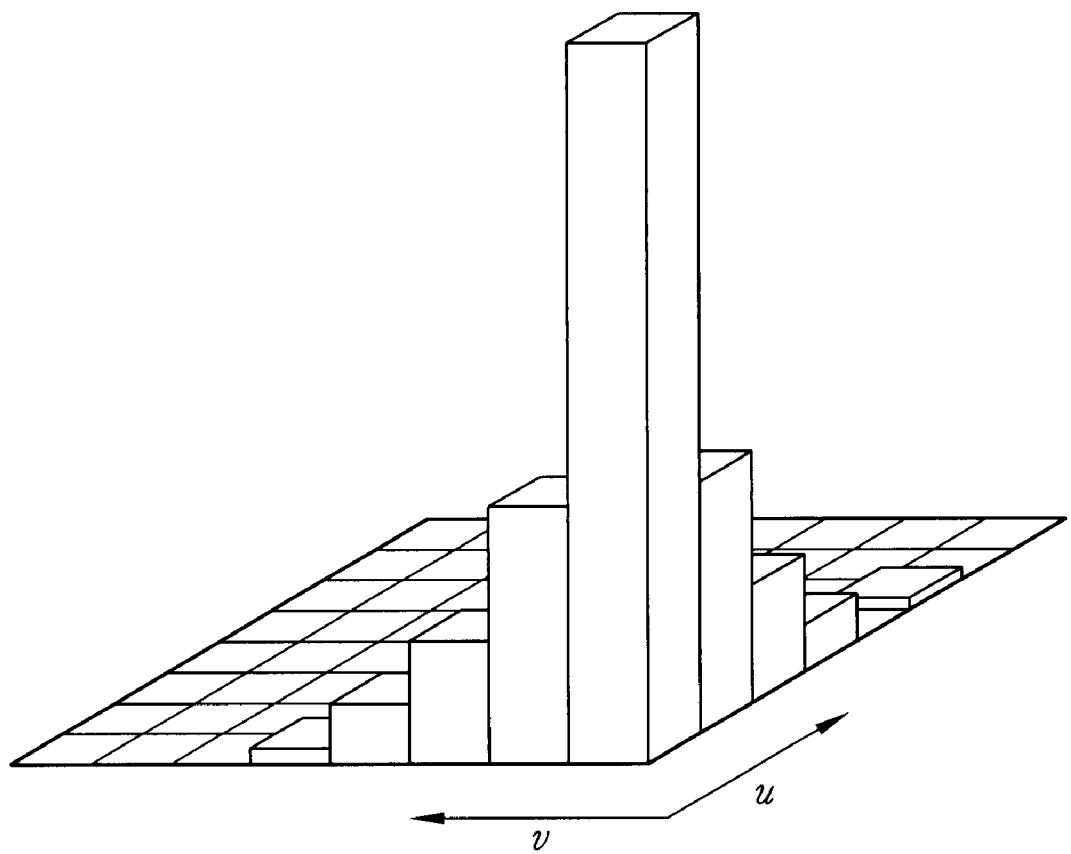
FIG. 6 illustrates a three-dimensional plot of frequency domain values on the u, v coordinate plane that might arise from and 8-pixel×8-pixel spatial domain subimage.

N=number of pixels on the side of a square spatial domain pixel array
x,y=pixel coordinates in the spatial domain
u,v=pixel coordinates in the frequency domain The discrete cosine transform ("DCT") transforms spatial domain pixel values, referenced by x,y coordinates in the spatial domain, to a frequency domain value referenced by u,v coordinates in the frequency domain. FIG. 6 illustrates a three-dimensional plot of the magnitudes, or absolute values, of frequency domain values on the u,v coordinate plane that might arise from spatial domain values such as the spatial domain values represented in FIG. 5. As is apparent from the DCT equation, shown above, all pixel values in the spatial domain, for example all 64 pixels within the 8-pixel× 8-pixel array shown in FIG. 5, contribute to each frequency domain value. A special case is the 0,0 frequency domain value $F_{(0,0)}$ which represents the average of the spatial domain values over the entire spatial domain. This can be easily seen by substituting the value 0 for variables "u" and "v" in the above DCT equation:

$$F_{(0,0)} = \frac{1}{N}\sum_{x=0}^{N-1}\sum_{y=0}^{N-1} f_{(x,y)}$$

The remaining values in the frequency domain, in aggregate, tend towards the value 0. Non-zero frequency domain values indicate periodic features within the spatial domain. The u,v coordinates that reference the value are inversely related to the length of the period in the spatial domain. The frequency domain representation of the image, such as the frequency domain representation shown in FIG. 6, can be transformed back to the spatial domain, such as the spatial domain representation shown in FIG. 5, using the reverse DCT:

$$f_{(x,y)} = \sum_{u=0}^{N-1}\sum_{v=0}^{N-1} \alpha(u)\alpha(v)F_{(u,v)}\cos\left[\frac{(2x+1)u\pi}{2N}\right]\cos\left[\frac{(2y+1)v\pi}{2\pi}\right]$$

Figure 7:
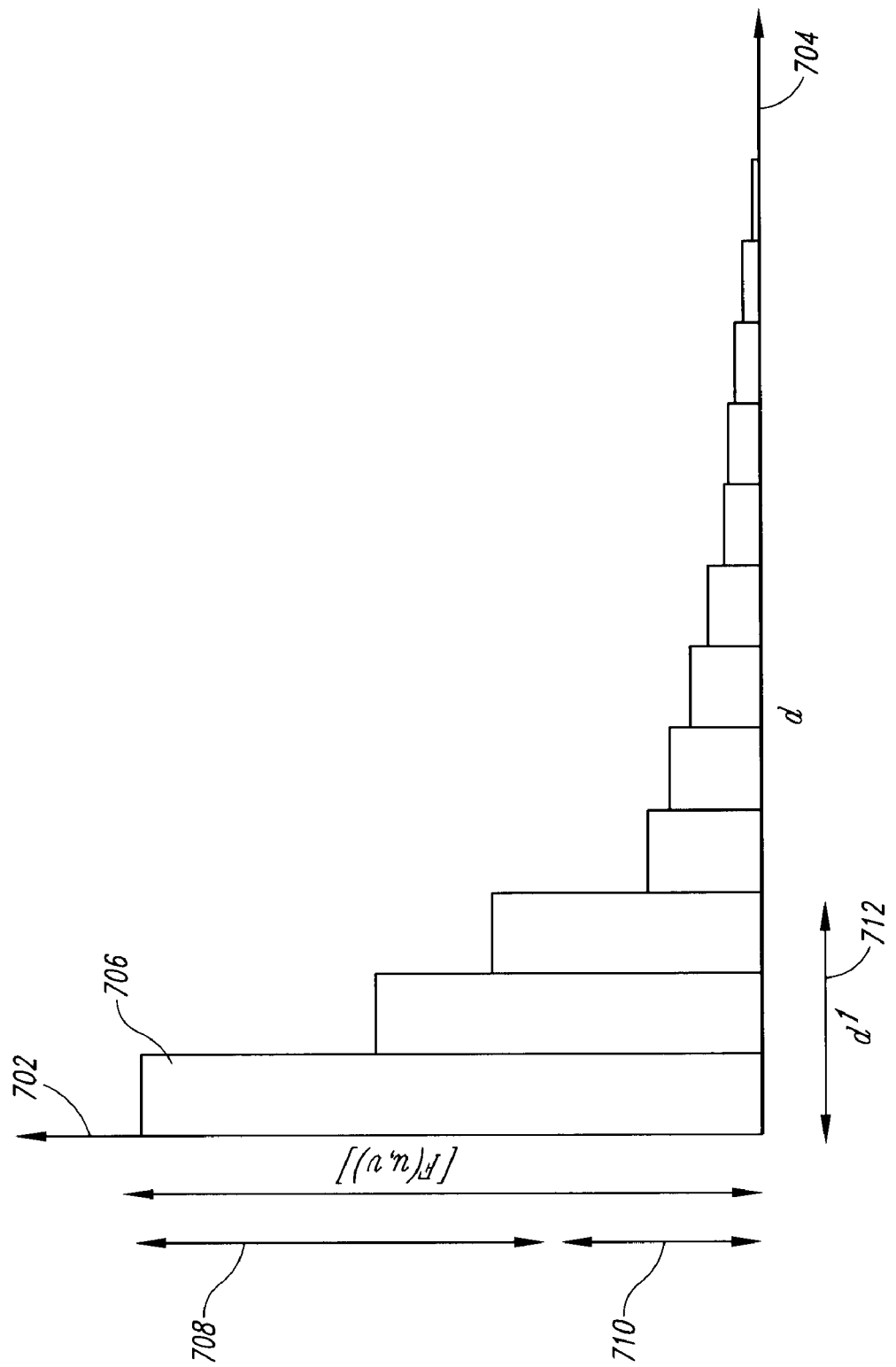
FIG. 7 represents the magnitude of the frequency domain values, along a vertical axis, with relation to the distance of the frequency domain value, along a horizontal axis, from the frequency domain origin.

JPEG compression methodologies make use of certain characteristics of the frequency domain values generated by DCT transformation of an image. FIG. 7 represents the magnitude of the frequency domain values, along a vertical axis, with relation to the distance of the frequency domain value, along a horizontal axis, from the frequency domain origin at u,v coordinates 0,0. The value at 0,0 706 generally has the largest magnitude, and the magnitudes of the values fall of rapidly with increasing distance from the frequency domain origin. The larger magnitude frequency domain values clustered around the frequency domain origin contain the bulk of the information content of the frequency domain representation of the image. The lower magnitude frequency domain values at greater distances from the origin correspond to higher frequency, more closely spaced, periodicities within the spatial domain representation of the image. The essence of JPEG image compression is to first transform subimages within the image, via the DCT, into the frequency domain. The frequency domain values are generally expressed as 11-bit unsigned integers to represent the full range of frequency domain values from 0 up to $|F_{(0,0)}|$. Then, the frequency domain values are quantized to redistribute the higher frequency domain values over a smaller range of possible values, and to set the smaller frequency domain values to 0. For example, quantization of the frequency domain values in FIG. 7 might redistribute the higher magnitude values in the range 708 as lower values and eliminate, or set to 0, the lower magnitude values in the range 710. This quantization would result in retaining the frequency domain values within a distance of $d^1$ 712 from the frequency domain origin. In this case, assuming that the frequency domain values are symmetrically distributed about the origin, quantization may produce a thirty-fold reduction in the number of non-zero frequency domain values. The remaining, quantized frequency domain values are then encoded by difference and Huffman encoding with tailing 0 values truncated.

Figure 8:
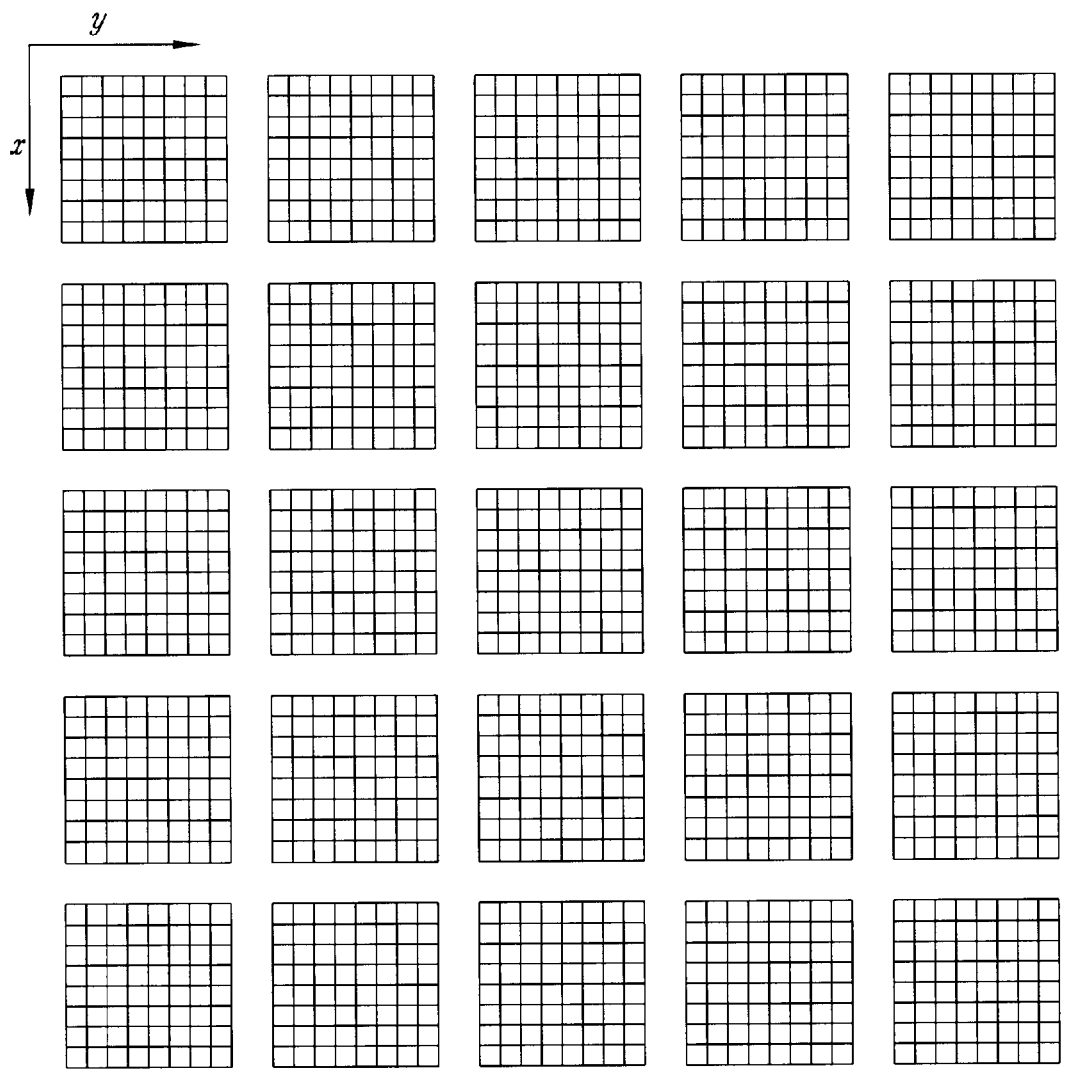
FIGS. 8–10 illustrate JPEG compression and decompression techniques in greater detail.
Figure 9:
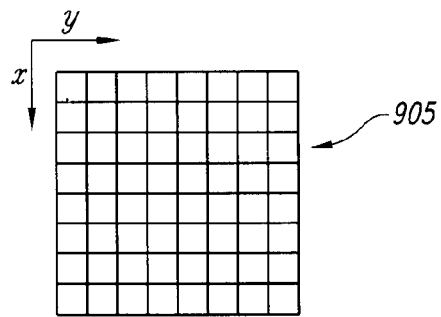
Figure 9:
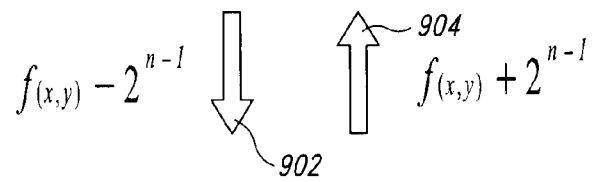
Figure 9:
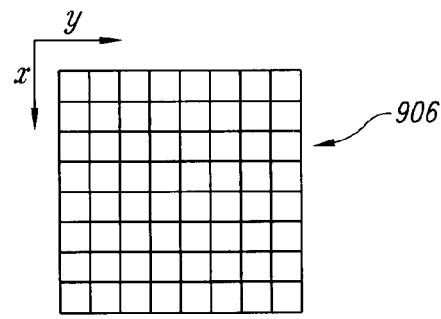
Figure 9:
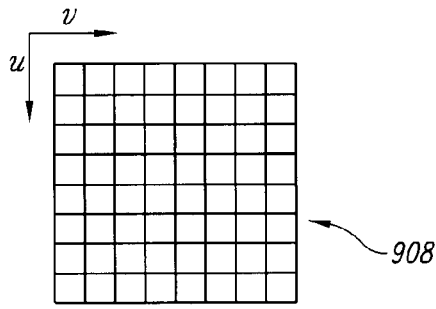
Figure 10:
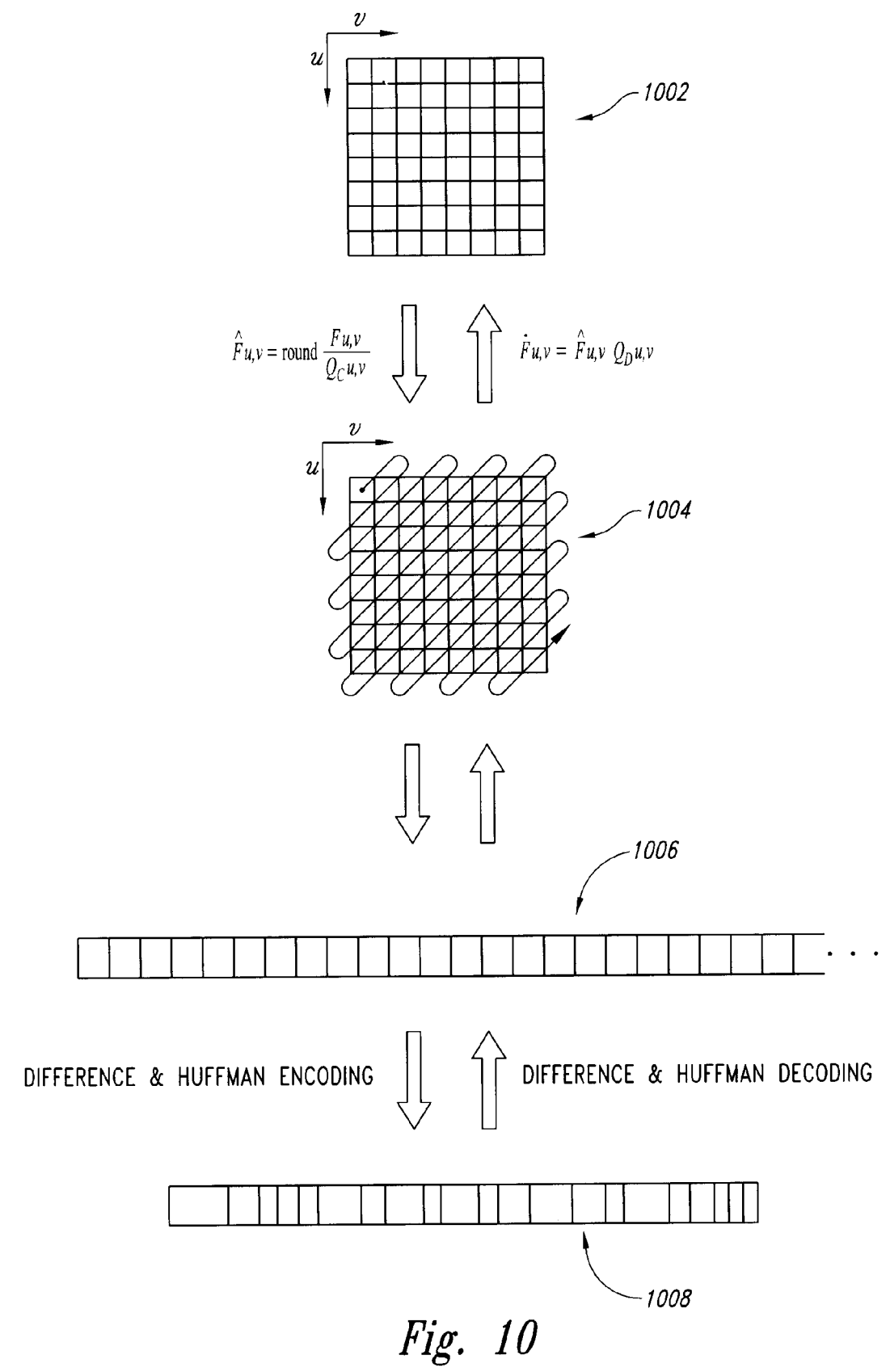

FIGS. 8–10 illustrate the JPEG compression and decompression techniques in greater detail. In the first step of image compression, as illustrated in FIG. 8, an image pixel array, such as the pixel array shown in FIG. 3, is decomposed into 8-pixel×8-pixel subimages. During compression, each 8-pixel×8-pixel subimage is compressed separately, and, during decompression, each 8-pixel×8-pixel subimage is separately restored. The compression and decompression technique is illustrated for an 8-pixel×8-pixel subimage in FIGS. 9 and 10.

FIGS. 9 and 10 illustrate the various steps involved in compressing and decompressing an 8-pixel×8-pixel subimage. The compression steps are indicated by downwardly directed arrows, such as downwardly directed arrow 902, and the decompression steps are indicated by upwardly directed arrows, such as upwardly directed arrow 904. In FIG. 9, the unsigned spatial domain values in the 8-pixel×8-pixel subimage 905 are transformed into signed values in the spatial domain subimage 906 by subtracting the value of $2^{n-1}$ from each spatial domain value where n is the length, in pixels, of one side of the subimage, in this case, 8. The signed spatial domain values in subimage 906 are then transformed into frequency domain values in the frequency domain subimage 908 via the DCT. In FIG. 10, the frequency domain values in the frequency domain subimage 1002 (identical to the frequency domain subimage 908 in FIG. 9) are quantized by dividing each frequency domain value by corresponding compression quantization matrix ("$Q_C$") and rounding the result to the nearest integer in order to produce the quantized frequency domain subimage 1004. The quantized frequency domain values are then selected, in the zig zag order indicated in FIG. 10, to produce a one-dimensional array of quantized frequency domain values 1006. The one-dimensional array of quantized frequency domain values are then encoded by difference in Huffman encoding to produce a compressed encoded bit stream representation 1008 of the quantized frequency domain values.

Decompression starts with decoding the representation of the quantized frequency domain values 1008 to the n-dimensional array of quantized frequency domain values 1006. This is a form of lossless decompression. The one-dimensional array of quantized frequency domain values 1006 is then rearranged to produce the quantized frequency domain value subimage 1004. Approximations of the original unquanitzed frequency domain values are calculated by multiplying each quantized frequency domain value in subimage 1004 by a corresponding value in a decompression quantization matrix ("$Q_D$") to produce an approximation of the original frequency domain subimage 1002. This approximation results because the rounding step in the corresponding compression stage results in loss of information that cannot be recovered. Thus, the frequency domain subimage 1002 resulting from decompression of the quantized frequency domain subimage 1004 is an approximation of the original frequency domain subimage 1002 generated during the compression cycle. In FIG. 9, the frequency domain subimage 908 (1002 in FIG. 10) is transformed by the reverse DCT to the assigned spatial domain subimage 906, which is then transformed by the addition of the value $2^{n-1}$ for each spatial domain value to produce the final restored spatial domain subimage 905. Because of the information loss in the rounding step, discussed above, the restored spatial domain subimage 905 is generally different from the original spatial domain subimage that was previously compressed and then decompressed.

Figure 11A:
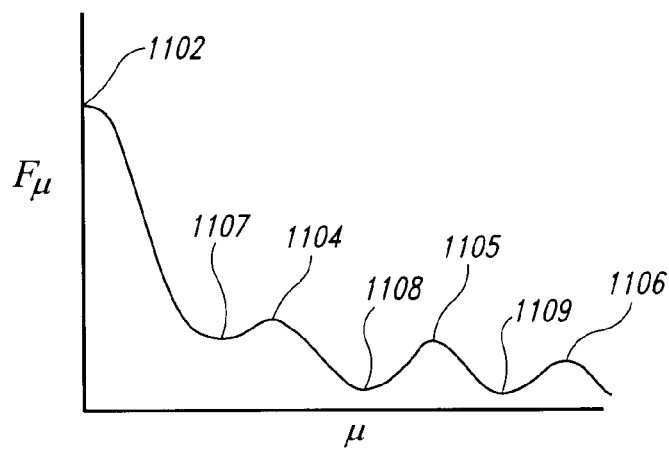
FIG. 11A shows a one-dimensional frequency domain representation of an image.

FIGS. 11A–C and 12A–C illustrate one approach to frequency domain image enhancement. In FIGS. 11A–C and FIGS. 12A–C, the magnitude of frequency domain values was plotted on the vertical axis and the magnitude of the distance of the value from the frequency domain origin is plotted on the horizontal axis. Thus, FIG. 11A is similar to FIG. 7. FIG. 11A shows the one-dimensional frequency domain representation of an image. The frequency domain representation features a large $F_{(0,0)}$ value 1102 and various higher-frequency peaks 1104–1106 and valleys 1107–1109. The higher-frequency peaks are inversely related to spatial domain periodicities, as discussed above.

Figure 11B:
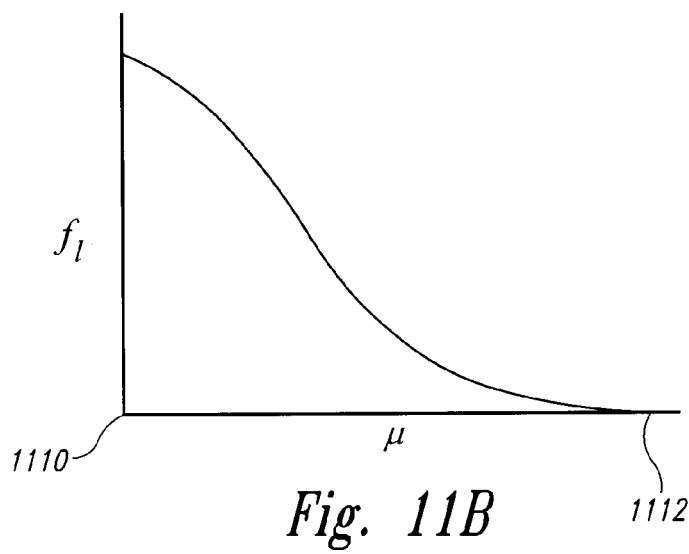
FIG. 11B illustrates the functional representation of a low pass filter.
Figure 11C:
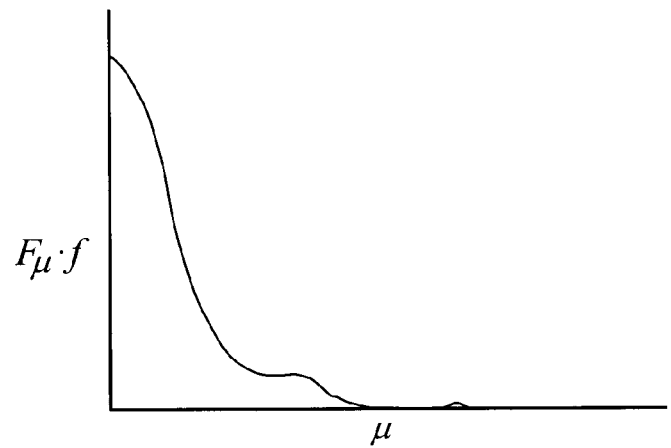
FIG. 11C shows the frequency domain representation of a printed version of the image represented in FIG. 11A.

FIG. 11B illustrates the functional representation of a low pass frequency filter. Lower frequencies, close to the frequency domain origin 1110, are unaffected by the low pass filter. However, frequency domain values are increasingly diminished, or more completely filtered, with increasing frequency, or distance from the frequency domain origin 1110. Frequency domain values higher than frequency 1112 are completely filtered by the low pass filter functionally represented in FIG. 11B. Many image presentation devices, such as printers, act as low pass filters. FIG. 11C shows the frequency domain representation of a printed version of the image represented in FIG. 11A. FIG. 11C is generated by applying the low pass filter function represented in FIG. 11B to the frequency domain representation of the image in FIG. 11A. Note that the shape of the curve in FIG. 11C at low frequencies is similar in shape and magnitude to the curve in FIG. 11A, but, at higher frequencies, much of the detail of the curve in FIG. 11A has been lost in FIG. 11C. The higher frequency detail corresponds to higher resolution periodicities in the spatial domain representation of the image. A spatial domain image that has undergone frequency domain filtering by a low pass filter appears softened and fuzzy with respect to the original unfiltered spatial domain image.

Figure 12A:
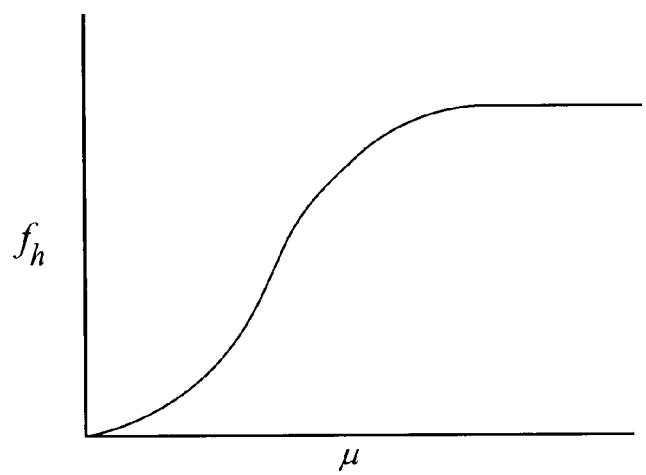
FIG. 12A shows a representation of a high pass filter inverse to the low pass filter of FIG. 11B.
Figure 12B:
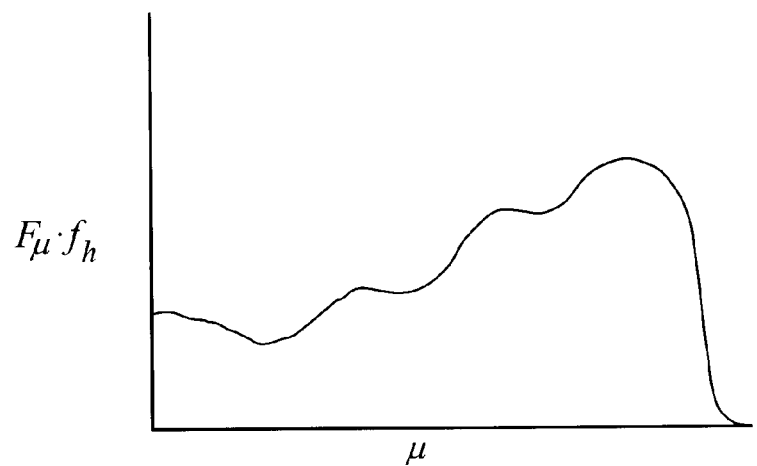
FIG. 12B shows a representation of the high pass filter of FIG. 12A applied to the frequency domain representation of the image shown in FIG. 11A.
Figure 12C:
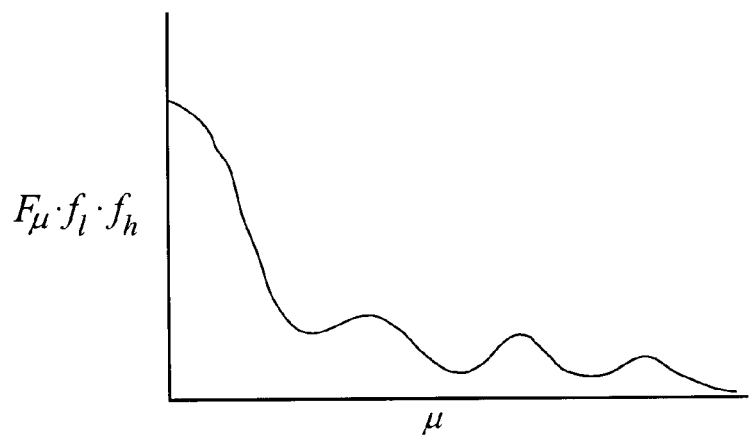
FIG. 12C shows the frequency domain representation of a printed version of the transformed representation shown in FIG. 12B.

FIG. 12A shows a representation of a high pass frequency filter inverse to the low pass frequency filter of FIG. 11B. If the high pass frequency filter of FIG. 12A were applied to the low pass frequency filter of FIG. 11B, the resulting function would be a flat horizontal line that, when applied to a frequency domain image representation, such as the representation in FIG. 11A, would produce no change in the shape of the frequency domain image representation curve. If it is known in advance that an image, such as the image represented in the frequency domain in FIG. 11A, presented on a presentation device that acts as a low pass filter, such as the low pass filter shown in FIG. 11B, an inverse filter, such as the filter shown in FIG. 12A, can be applied to the frequency domain values of the image, as shown in FIG. 11A, to produce an enhanced frequency domain image shown in FIG. 12B. When the enhanced frequency domain image shown in FIG. 12B is presented by the presentation device acting as the loss pass filter shown in FIG. 11B, the resulting image will have the frequency domain representation of FIG. 12C, similar to the original frequency domain representation in FIG. 11A. Such enhancements can be incorporated into the compression and decompression techniques illustrated in FIGS. 9 and 10 by choosing modified $Q_C$ and $Q_D$. For example, when no enhancement is desired, $Q_C$ is commonly equal to $Q_D$. However, when a high frequency boost is desired, such as the high frequency boost achieved by application of the high frequency pass filters shown in FIG. 12A, a different $Q_D$ that accomplishes the high frequency boost can be generated from $Q_C$ by multiplying $Q_C$ by a scaling factor. Additional, more complex enhancements to account for other types of characteristics of presentation devices can be incorporated either into the $Q_C$ or the $Q_D$. A default $Q_D$ is assumed in accordance with the JPEG compression standard. The JPEG compression standard allows for inclusion of specialized QDS into compressed image files for effecting various enhancements and visual alterations upon restoration of the image through decompression and presentation.

The above description of JPEG image compression, decompression, and enhancement sets the stage for a concise delineation of one embodiment of the present invention. In this embodiment, a server computer stores a single version of each JPEG mage file that the server computer makes available to client computers. The single version of the JPEG image file may be stored either in a compressed form or, alternatively, may be stored in the form of frequency domain values, call coefficients, that result from DCT transformation of a spatial domain representation of the image. In either case, the stored JPEG image representation has preferably not undergone quantization with concomitant loss of information. For example, if the JPEG image file is stored in compressed form, the compression generally omits the quantization step and relies chiefly on difference and Huffman encoding in order to decrease the size of the stored image. In alternative embodiments, the single version of the JPEG image file may be stored in a slightly quantized form. In the case that the image file is stored as a set of frequency domain coefficients, the frequency domain coefficients are either unquantized or only slightly quantized. Under this embodiment, a client can pre-register client computer capabilities and user preference parameters with the server computer or, alternatively, the client computer capability and user preference parameters may be furnished to the server computer at the time that the server computer receives from the client computer a request for the JPEG image file. The server computer then determines a $Q_C$ and, if necessary and acceptable, a $Q_D$ that produce a compression ratio and image enhancements that correspond to the client computer capabilities and user preferences. The server computer then quantizes the frequency domain coefficients using the determined $Q_C$ and then further compresses the quantized frequency domain coefficients by difference and Huffman encoding, according to the JPEG compression standard. If a specialized $Q_D$ has been chosen by the server computer, that specialized $Q_D$ is included in the compressed JPEG image file. The compressed JPEG image file is then sent to the requesting client computer.

Under this embodiment, only a single compressed version of each JPEG image file is stored on the server computer. Thus, the problems of storing multiple versions of each JPEG image file, described with reference to FIG. 2, are avoided. Furthermore, the on-demand compression carried out by the server starts with frequency domain coefficients rather than a spatial domain representation of the JPEG image. This technique avoids the computational overhead of application of the DCT to spatial domain image representations and avoids the need for the server computer to devote large, generally contiguous, blocks of memory for storing the spatial domain representation of the image prior to application of the DCT. Because many powerful image enhancement techniques can be carried out during the quantization step, the server computer, under the present embodiment, can tailor on demand compression not only to produce compression ratios compatible with the transfer bandwidth and display capabilities of the client computer, but can also enhance the image for more faithful rendering and presentation on client computer presentation devices, such as color printers.

Figure 13:
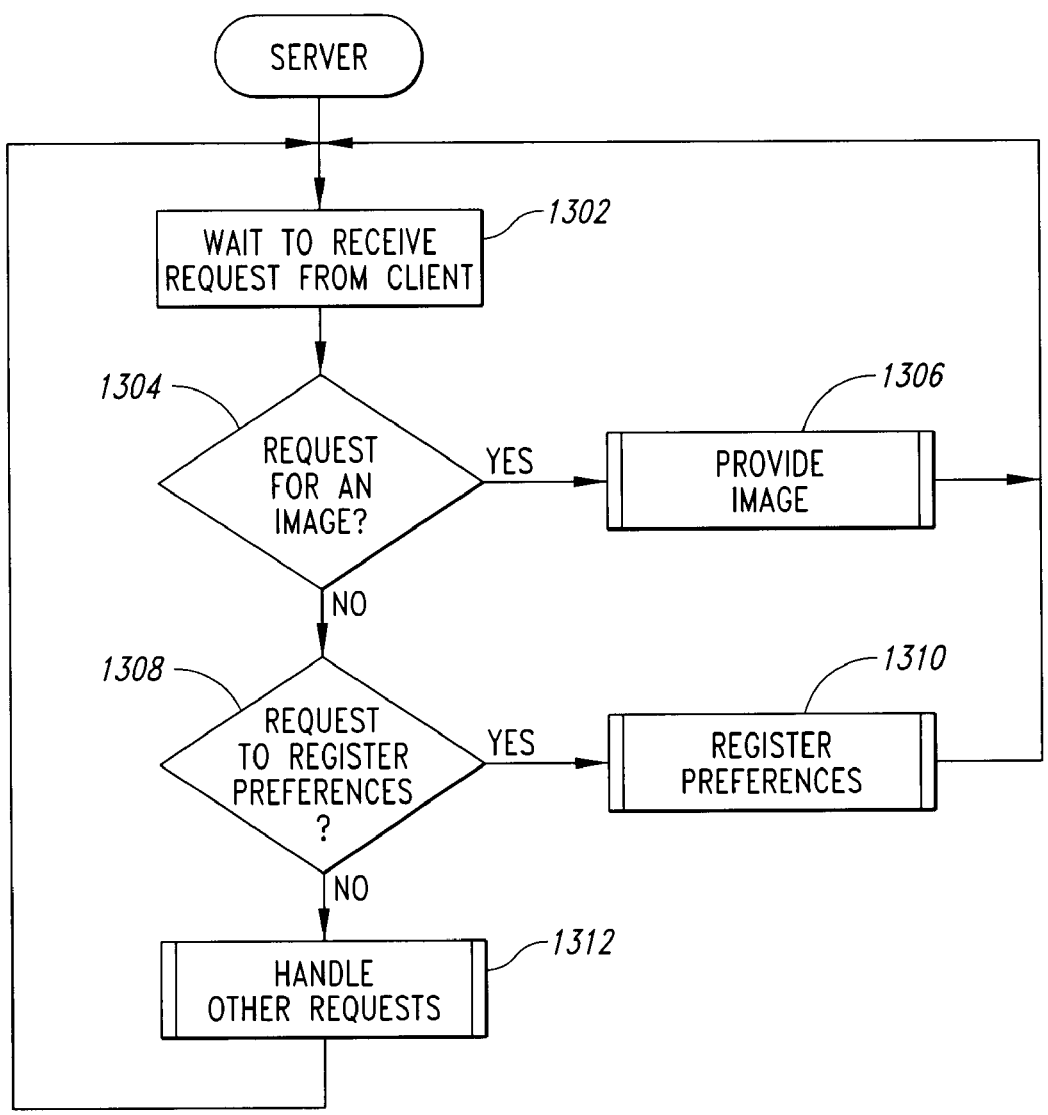
FIG. 13 is a high-level flow control diagram of an image serving process that runs on a server computer.

FIGS. 13–16 provide a flow control diagram representation of one embodiment of the present invention. FIG. 13 is a high-level flow control diagram of an image serving process that runs on a server computer. In step 1302, the image serving process waits for a next request from a client computer and, when the next request arrives, awakens and begins processing the request. In step 1304, the image serving process determines whether the request is a request for a JPEG image file. If so, then in step 1306, the image serving process calls the routine "provide_image" to retrieve the image from a data storage component, such as a disk, and send the image to the requesting client computer, after which the image serving routine returns to step 1302 to wait for the next client request. If the request was not for a JPEG image, as detected by the image server routine in step 1304, the image serving routine determines, in step 1308, whether the client computer is requesting to register a set of client computer capabilities and user preferences to be used for future image requests. If so, then the image serving routine, in step 1310, calls a routine "register_preferences" to collect the client computer capabilities and user preferences and store them in a database or other storage facility for later use in processing requests for images from the client computer. The routine "register_preferences" may be implemented in many different fashions depending on the storage and retrieval mechanisms desired, and will not be discussed further. Finally, if the request received from the client computer is not a request to register client computer capabilities and user preferences, then the request is handled in step 1312 by calling the routine "handle_other_requests" which will not be discussed further. Following completion of the calls to the routines "register_preferences" and "handle_other_requests," the image serving routine returns to step 1302 to wait for additional requests from client computers.

Figure 14:
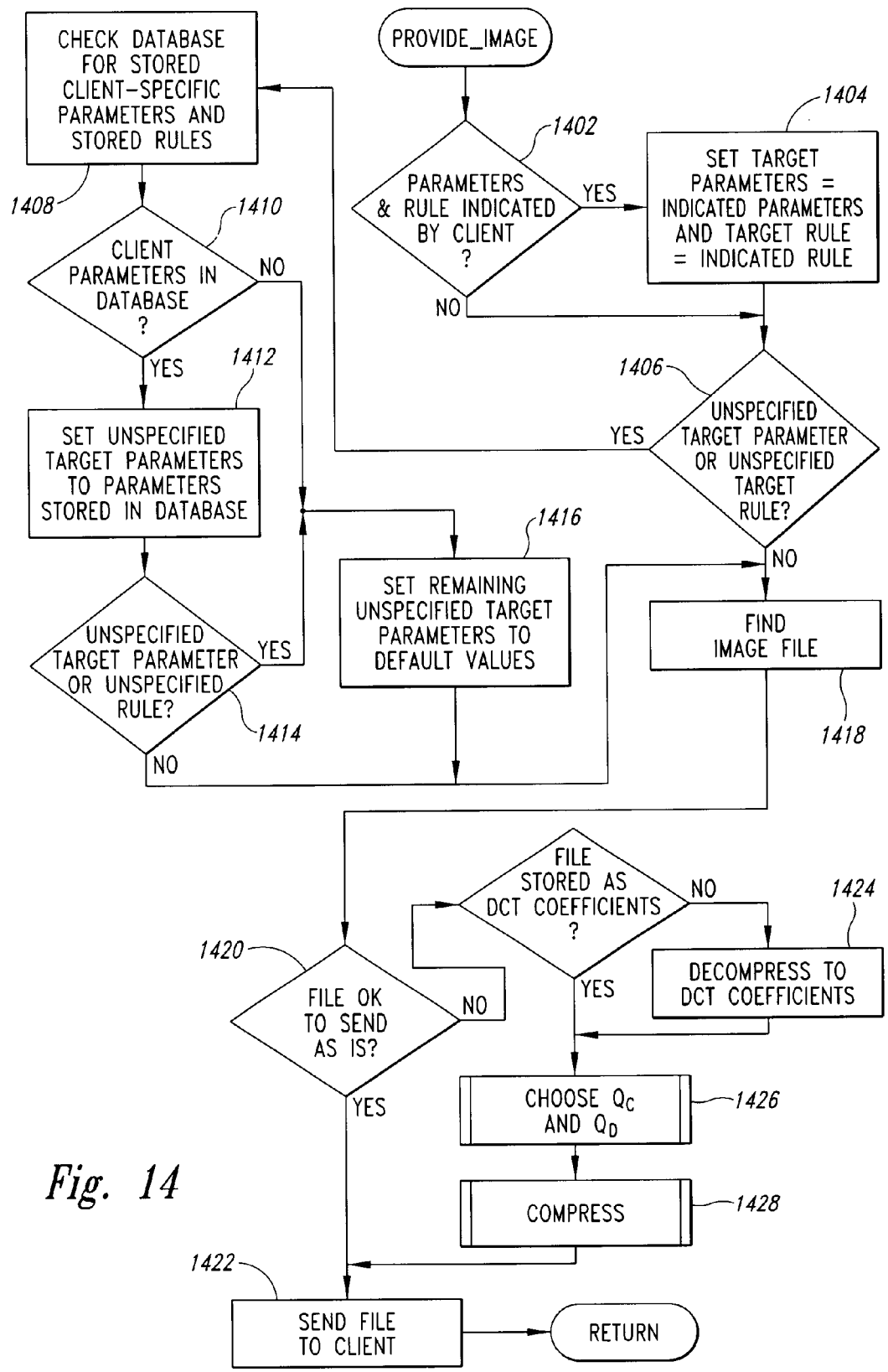
FIG. 14 is a flow control diagram of the routine "provide-image."

FIG. 14 is a flow control diagram of the routine "provide_image." This routine is called by the image serving process in step 1306 in FIG. 13. In step 1402, the routine "provide_image" determines whether the request for an image from a client computer includes an indication of client computer capabilities and user preference parameters and whether the request for the image includes a rule for applying the parameters. If so, then in step 1404, the routine "provide_image" sets target parameters equal to the indicated parameter values and, if the rule has been indicated, sets the target rule to the indicated rule. An example of an indicated parameter might, for example, be a parameter indicating the bandwidth of the client computer's interconnection with the Internet or, as another example, a parameter indicating the resolution of the client computer's intended display device. A rule may, for example, indicate that no loss of image resolution can be tolerated by the client computer or, as another example, that less than optimal image resolution is preferable to any delay in the transfer of the image file incurred by less than optimal compression. In step 1406, the routine "provide_image" determines whether any target parameters remain unspecified. If so, then in step 1408, the routine "provide_image" checks the contents of the database or another information storage mechanism to determine whether there are any client computer capabilities and user preferences stored for the client computer on the server. If there are stored parameters and rules, as detected in step 1410, then the server computer, in step 1412, sets any unspecified target parameters and the possibly unspecified target rule to the values stored in the database or other storage mechanism. If unspecified target parameters remain, as detected by the routine "provide_image" in step 1414, the routine "provide_image" sets any remaining unspecified target parameters, to default values in step 1416.

In step 1418, the routine "provide_image" locates the requested image file within a data storage component of the server computer. In step 1420, the server computer determines whether the stored image file, which may be stored in a JPEG compressed form, is already sufficiently well-tailored to the client computer capabilities and user preferences determined in the preceding steps. If so, then the routine "provide_image" sends the retrieved file to the client computer in step 1422 and returns. Otherwise, the routine "provide_image" determines whether the file is stored as DCT coefficients or whether the file is stored as a compressed JPEG image file. In the latter case, the routine "provide_image" decompresses the compressed JPEG file to DCT coefficients in step 1424, as described with reference to FIG. 10. In step 1426, the routine "provide_image" calls the routine "choose_$Q_C$_and_$Q_D$" to determine a suitable $Q_C$ and possibly a specialized $Q_D$ and then, in step 1428, uses the determined $Q_C$ to compress the DC coefficients representing the image to a JPEG compressed image file in order to send the compressed JPEG image file, in step 1422, to the client computer.

Figure 15:
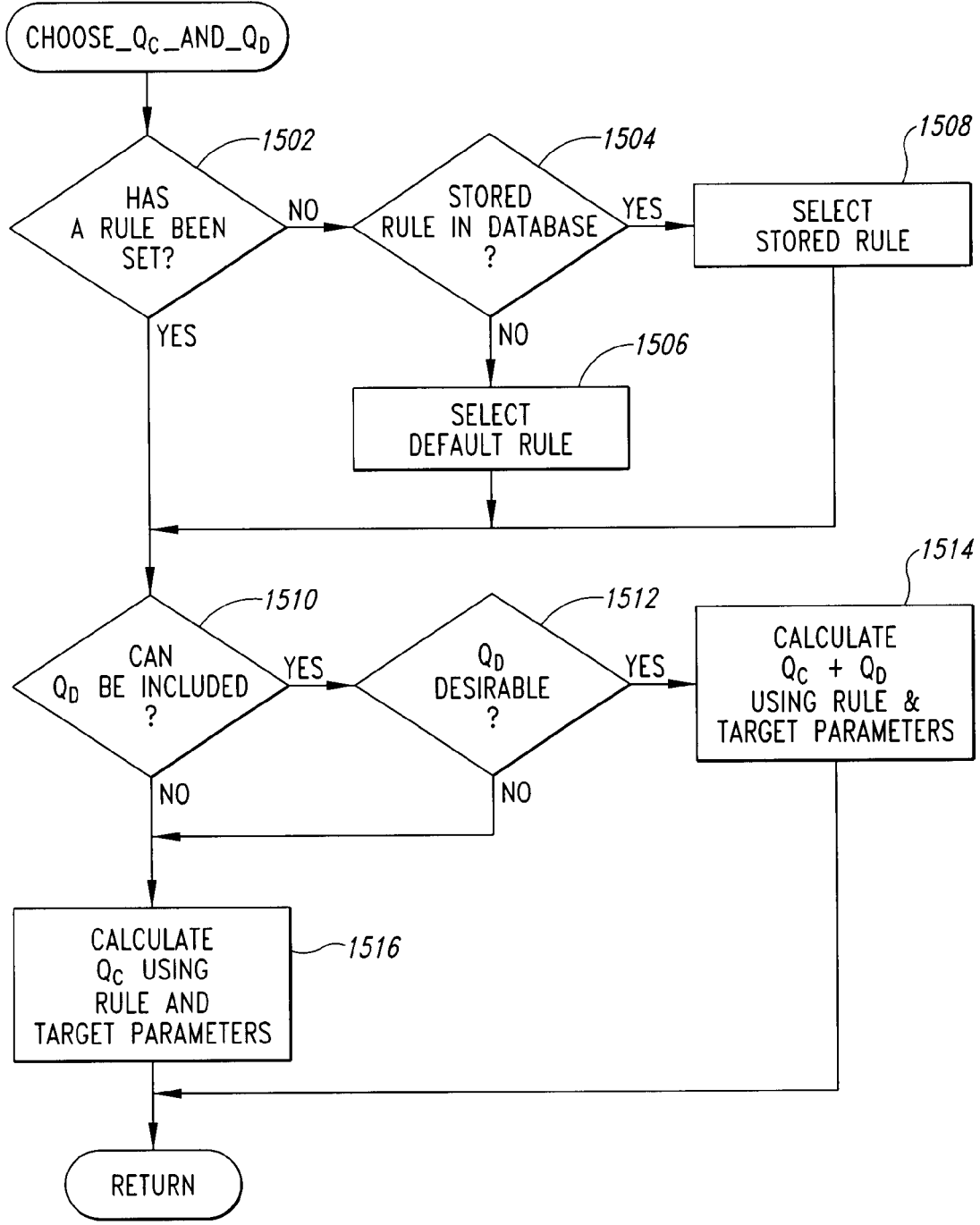
FIG. 15 is a flow control diagram of the routine "choose__ $Q_C$__and__$Q_D$."

FIG. 15 is a flow control diagram of the routine "choose_$Q_C$_and_$Q_D$." The routine "choose_$Q_C$_and_$Q_D$" is called by the routine "provide_image" in step 1426 of FIG. 14. In step 1502, the routine "choose_$Q_C$_and_$Q_D$" determines whether a target rule has already been set by the routine "provide image." If not, then in step 1504, the routine "choose_$Q_C$_and_$Q_D$" determines whether a target rule is stored for the client computer in a database or other storage mechanism. If not, then the routine "choose_$Q_C$_and_$Q_D$," in step 1506, selects a default rule. Otherwise, in step 1508, the routine "choose_$Q_C$_and_$Q_D$" selects the rule for the target rule that is stored in the database or other storage mechanism. At this point, the target parameters and target rule are fully specified, either from data supplied by the client computer, from default values, or from a combination of the two. In step 1510, the routine "choose_$Q_C$_and_$Q_D$" determines whether it is possible to include a $Q_D$ in the compressed file sent to the client computer. If so, then in step 1512, the routine "choose_$Q_C$_and_$Q_D$" determines whether it is desirable to include a specialized $Q_D$ in the compressed file for sake of image enhancement. If so, then in step 1514, the routine "choose_$Q_C$_and_$Q_D$" calculates $Q_C$ and $Q_D$ by using the target rule and target parameters. As discussed above, the target rule may specify various tradeoffs and absolute requirements that the server computer must make in balancing the target compression ratio and choosing various types of image enhancements. If inclusion of a specialized $Q_D$ is either not allowable or is not desirable in the case of the currently requested JPEG image file, the routine "choose_$Q_C$_and_$Q_D$" calculates a $Q_C$ in step 1516 according to the target rule and target parameters.

Figure 16:
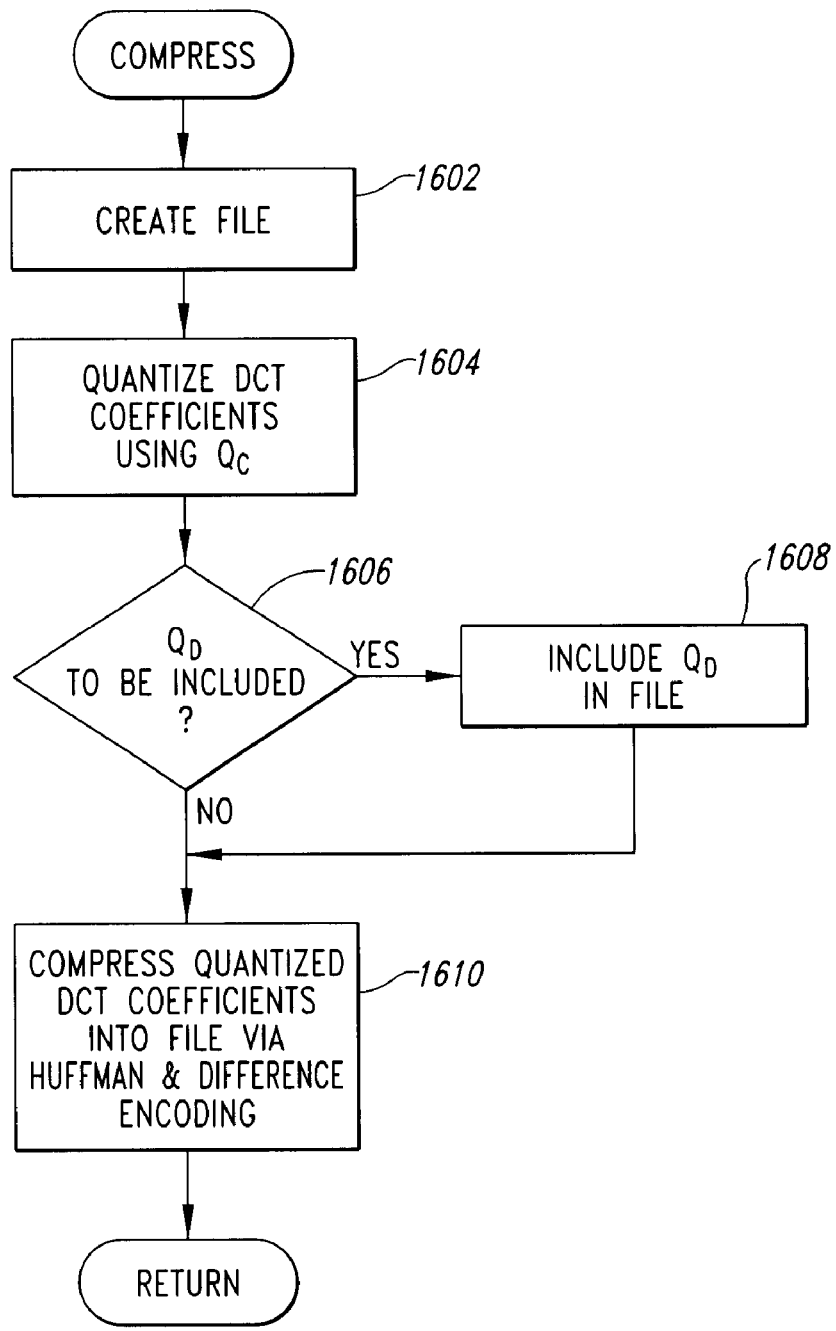
FIG. 16 is a flow control diagram of the routine "compress."

FIG. 16 is a flow control diagram of the routine "compress." The routine "compress" is called by the routine "provide_image" in step 1428. In step 1602, the routine "compress" creates a new file that will contain the fully compressed JPEG image file that is to be sent to the client computer. In step 1604, the routine "compress" quantizes the DCT coefficients representing the requested JPEG image using the $Q_C$ determined by the routine "choose_$Q_C$_and_$Q_D$" in step 1606, the routine "compress" determines whether a specialized $Q_D$ is to be included in the compressed JPEG image file, and, if so, includes the specialized $Q_D$ into the newly created file in step 1608. Finally, in step 1610, the routine "compress" compresses the quantized DCT coefficients using Huffman indifference encoding, as discussed with reference to FIG. 10, and places the resulting compressed quantized DCT coefficients into the JPEG image file.

Although the present invention has been described in terms of a particular embodiment, it is not intended that the invention be limited to this embodiment. Modifications within the spirit of the invention will be apparent to those skilled in the art. For example, the method of the present invention may be implemented as one or more software modules written in many different programming languages, using many different modular organizations, to run on many different hardware and operating system platforms. Although the embodiment described in detail related to serving JPEG images over the Internet, many different types of data can be transformed into the frequency domain for subsequent quantization to achieve compressibility and data enhancements, and many different communications vehicles may be be employed to transfer the compressed data. For example, video data, audio data, and image and graphics data can all be processed following transformation to the frequency domain. The transfer can be accomplished over intranets, serial communications networks, telephone lines, and broadcast media when the client computer is remote from the server computer. In the case that a client process requests and receives compressed data from a server process running on the same computer system as the client process, various inter-process communications connections can be used, including mail boxes, shared memory, and sockets. Transformation of data to the frequency domain can be accomplished using many different mathematical transforms implemented in many different ways, including Fourier transforms, fast Fourier transforms, Walsh transforms, Hadamard transforms, Haar transforms, Slant transforms, and Hotelling transforms. Moreover, many different types of compression techniques and algorithms may be used to compress quantized frequency domain coefficients into compressed data files for transfer. In the above-described embodiment, JPEG compression techniques are used, but many other methodologies can be employed.

The foregoing description, for purposes of explanation, used specific nomenclature to provide a thorough understanding of the invention. However, it will be apparent to one skilled in the art that the specific details are not required in order to practice the invention. In other instances, well-known components are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifacations as are suited to the particular use contemplated. It is intended that the scope of the invention be defined by the following claims and their equivalents.

What is claimed is:

1. A method for providing a data file by a server entity to a client entity for presentation by the client entity, the method comprising:

storing a frequency domain representation of the data file by the server entity;

upon receiving by the server entity a request from the client entity for the data file, when the data file is stored in a compressed form, uncompressing the data file to a set of frequency domain coefficients;

quantizing and compressing the frequency domain coefficients according to a set of parameters to create a specially compressed data file; and sending the specially compressed data file to the client entity where the specially compressed data file is subsequently decompressed and presented.

2. The method of claim 1, wherein the server entity is a process running on a server computer, wherein the client entity is a process running on a client computer, and wherein the server entity receives the request from the client entity via the Internet and the server entity sends the specially compressed data file to the client entity via the Internet.

3. The method of claim 1, wherein the data file represents an image.

4. The method of claim 1, wherein the data file is an audio file.

5. The method of claim 1, wherein the data file is a video file.

6. The method of claim 1, wherein the data file represents a computer graphics display.

7. The method of claim 1, wherein the data file is presented by the client entity by rendering and displaying the data file on a visual display device.

8. The method of claim 1, wherein the data file is presented by the client entity by rendering and printing the data file on a printing device.

9. The method of claim 1, wherein the server entity stores the data file by transforming the data file via a mathematical transform to frequency domain coefficients and then stores the frequency domain coefficients.

10. The method of claim 9, wherein the mathematical transform is a Discrete Cosine Transform.

11. The method of claim 9, wherein the mathematical transform is a Discrete Fourier Transform.

12. The method of claim 1, wherein the server entity stores the data file by transforming the data file via a mathematical transform to frequency domain coefficients, compresses the frequency domain coefficients into a compressed data file, and stores the compressed data file.

13. The method of claim 12, wherein the mathematical transform is a Discrete Cosine Transform and wherein the server entity compresses the frequency domain coefficients using difference and Huffman encoding.

14. The method of claim 12, wherein the mathematical transform is a Discrete Fourier Transform and wherein the server entity compresses the frequency domain coefficients using difference and Huffman encoding.

15. The method of claim 1, wherein, when the data file is stored by the server entity in a compressed form, the server entity decompresses the data file to a set of frequency domain coefficients by difference and Huffman decoding.

16. The method of claim 1, wherein the parameters include a parameter indicating the bandwidth for transfer of the specially compressed data file.

17. The method of claim 1, wherein the parameters include a parameter indicating the low pass frequency filter characteristics of a presentation device on which the client entity presents the data file.

18. The method of claim 1, wherein the parameters include a parameter indicating an intensity diminishing characteristics of a presentation device on which the client entity presents the data file.

19. The method of claim 1, wherein quantizing and compressing the frequency domain coefficients according to a set of parameters to create a specially compressed data file further includes:

choosing a compression quantization matrix to achieve a compression ratio consistent with the parameters;

applying the compression quantization matrix to the frequency domain coefficients to quantize the frequency domain coefficients; and compressing the quantized the frequency domain coefficients to create a specially compressed data file.

20. The method of claim 1, wherein quantizing and compressing the frequency domain coefficients according to a set of parameters to create a specially compressed data file further includes:

choosing a compression quantization matrix to achieve a compression ratio consistent with the parameters and to achieve an image enhancement consistent with the parameters;

applying the compression quantization matrix to the frequency domain coefficients to quantize the frequency domain coefficients; and compressing the to quantized the frequency domain coefficients to create a specially compressed data file.

21. The method of claim 1, wherein quantizing and compressing the frequency domain coefficients according to a set of parameters to create a specially compressed data file further includes:

choosing a compression quantization matrix to achieve a compression ratio consistent with the parameters and to achieve an image enhancement consistent with the parameters;

choosing a specialized decompression matrix to achieve an image enhancement consistent with the parameters;

applying the compression quantization matrix to the frequency domain coefficients to quantize the frequency domain coefficients; and compressing the quantized the frequency domain coefficients to create a specially compressed data file, including in the specially compressed file the specialized decompression matrix.

22. A system that transfers a data file, requested by a client entity, to the client entity for presentation by the client entity, the system comprising:

a communications connection between the client entity and a server entity;

a server process running on the server entity that receives a request for the data file from the client entity;

a frequency domain representation of the data file stored in a data storage component of the server entity accessible to the server process; and an on-demand compression process running on the server entity that, following receipt of a request from the client entity for transfer of the data file, compresses the frequency domain representation of the data file into a specially compressed file that is transferred via the communications connection to the client entity.

23. The system of claim 22, wherein the server entity is a server computer, wherein the client entity is a process running on a remote computer system, and wherein the communications connection is the Internet.

24. The system of claim 22, wherein the server entity is a server computer, wherein the client entity is a process running on a remote computer system, and wherein the communications connection is an intranet.

25. The system of claim 22, wherein the server entity is a server computer, wherein the client entity is a process running on the server computer, and wherein the communications connection is an inter-process communications facility.

26. The system of claim 22, wherein, when the frequency domain representation of the data file is stored in the data storage component in compressed form, the server entity decompresses the frequency domain representation of the data file to frequency domain coefficients.

27. The system of claim 26, wherein the on-demand compression process determines a target compression ratio, quantizes the frequency domain coefficients to achieve the determined target compression ratio, and compresses the quantized frequency domain coefficients into the specially compressed data file.

28. The system of claim 26, wherein the on-demand compression process determines a target compression ratio and a target data enhancement, quantizes the frequency domain coefficients to achieve the determined target compression ratio and target data enhancement, and compresses the quantized frequency domain coefficients into the specially compressed data file.

29. The system of claim 22, wherein the data file is an image file.

30. The system of claim 22, wherein the data file is a video file.

31. The system of claim 22, wherein the data file is an audio file.

32. The system of claim 22, wherein the data file is an image file.

* * * * *